United States Patent [19]

Stone

[11] 4,186,784
[45] Feb. 5, 1980

[54] TOOL TABLE CONSTRUCTION

[75] Inventor: John T. Stone, Saylorsburg, Pa.

[73] Assignee: Atlantic Container Corporation, Easton, Pa.

[21] Appl. No.: 817,630

[22] Filed: Jul. 21, 1977

[51] Int. Cl.² .............................................. B25H 1/02
[52] U.S. Cl. .................................... 144/253 J; 83/574; 108/28; 108/90; 144/1 R; 248/646; 428/464; 144/286 A
[58] Field of Search ............... 144/285, 286 R, 286 A, 144/286 B, 288, 1 R; 83/471.2, 471.3, 574; 126/306; 248/188.8, 188.9, 16, 14; 108/28, 50, 90; 428/464

[56] References Cited

U.S. PATENT DOCUMENTS

| | | | |
|---|---|---|---|
| 1,828,248 | 10/1931 | Hallowell et al. | 144/285 |
| 2,555,217 | 5/1951 | Young | 144/286 R X |
| 2,799,305 | 7/1957 | Groehn | 83/471.2 X |
| 3,110,643 | 11/1963 | Downing | 428/464 X |
| 3,342,226 | 9/1967 | Marcoux et al. | 144/288 R X |
| 3,580,367 | 5/1971 | McCarthy | 248/14 X |
| 3,787,014 | 1/1974 | Story et al. | 248/14 |

*Primary Examiner*—Robert Louis Spruill
*Assistant Examiner*—W. D. Bray
*Attorney, Agent, or Firm*—Harness, Dickey & Pierce

[57] ABSTRACT

A tool or work table for mounting tools such as sabre saws and routers and having a laminated work surface and a universal mounting plate for the saws and routers.

20 Claims, 7 Drawing Figures

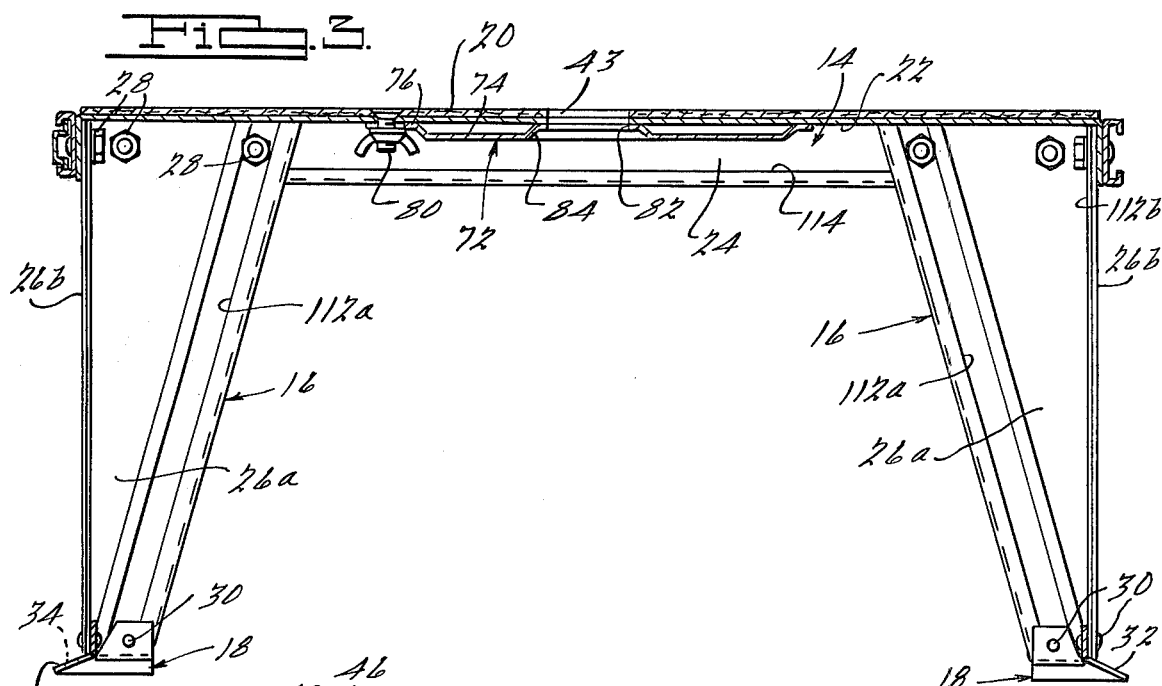
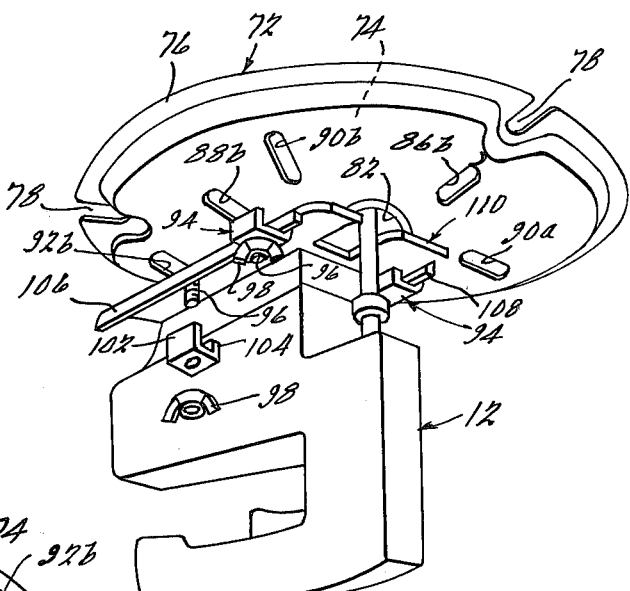
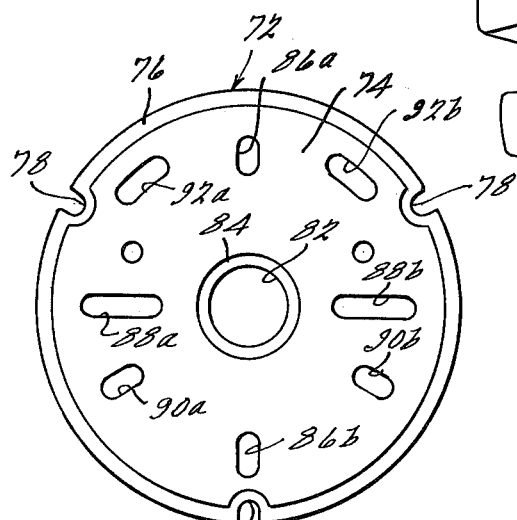

TOOL TABLE CONSTRUCTION

SUMMARY-BACKGROUND OF THE INVENTION

The present invention relates to tool or work tables for mounting tools and more particularly to tables for mounting a plurality of tools.

Tool or work tables have been provided in the past for holding various tools. In the tool table of the present invention a removable mounting plate is constructed to receive different sized sabre saws and a variety of routers, i.e. routers of either the 3 or 4 hole base plate type.

The work surface of the table is provided to be of a laminated construction utilizing a hardboard member fixed to a steel top. The hardboard member is "printable" and hence can have various pieces of information noted thereon, i.e. scales, alignment marks, tool information, etc.

The tool table of the present invention is of a lightweight construction and is readily portable and yet has means for securely fixing the table in a stationary position onto a table top.

Thus it is an object of the present invention to provide a tool table adapted to receive a plurality of different tools.

It is another object of the present invention to provide a tool table having a laminated work surface which is adapted to receive printed information.

It is another object of the present invention to provide a lightweight portable tool table.

It is another general object of the present invention to provide a new and improved tool table.

Other objects, features, and advantages of the present invention will become apparent from the subsequent description and the appended claims, taken in conjunction with the accompanying drawings, in which:

FIG. 3 is a sectional view of the tool table of FIG. 1 taken generally along the line 3—3 of FIG. 1;

FIG. 4 is a sectional view of the tool table of FIG. 1 taken generally along the line 4—4 of FIG. 1;

FIG. 5 is a plan view of a mounting plate for adapting the mounting of sabre saws and routers to the tool table;

FIG. 6 is a pictorial view depicting the assembly of a sabre saw to the mounting plate of FIG. 5; and FIG. 7 is a sectional view of the tool table of FIG. 1 taken generally along the line 7—7 of FIG. 1;

Figure 1:
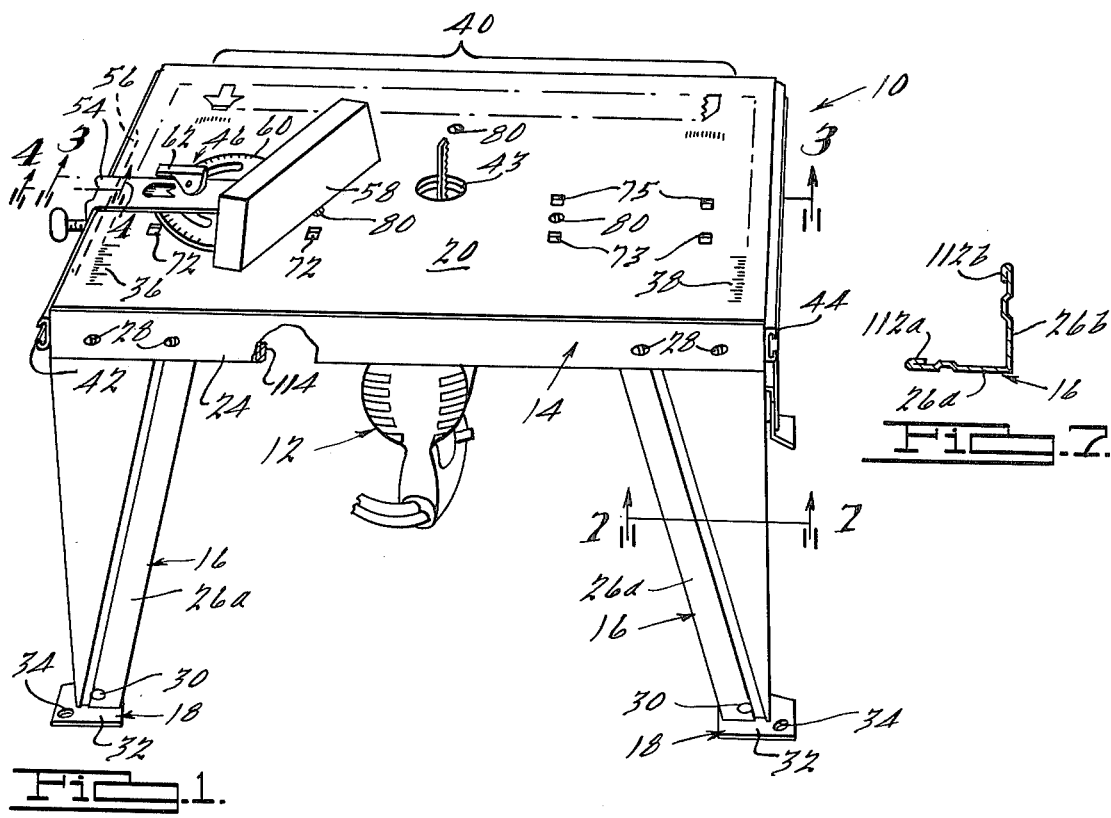
FIG. 1 is a pictorial view of a tool table embodying features of the present invention and depicted for use with a sabre saw.

Looking now to FIGS. 1 and 3 a tool or work table is generally indicated with the numeral 10 and is shown in assembly relationship with a sabre saw 12. The table 10 is comprised of a support or base member 14, a plurality of legs 16 connected to base member 14, a foot 18 connected to each leg 16, and a top 20 fixed to the support plate 12.

The base member 14 is a one piece stamped structure and includes a generally, rectangular flat upper portion 22 which has four sides 24 depending therefrom. The legs 16 are generally of a right angle construction defined by two identical tapering portions 26a and 26b. The legs 16 are secured to the corners of the support member 14 with fasteners 28 connecting tapering portions 26a and 26b at their wider ends to adjacent ones of the depending sides 24.

The feet 18 are connected to the lower, narrower ends of the tapering portions 26a and 26b by means of fasteners 30. The feet 18 are formed of heavier gauge material than the legs 16 and have base portions 32 which extend outwardly from the legs 16. The base portions are provided with openings 34 whereby the table 10 can be bolted or otherwise fastened to a support surface or to a table top.

The top 20 is comprised of hardboard or some similar fabricated material and is secured to the upper portion 22 via a suitable adhesive. Preferably the top 20 is secured substantially over its entire surface to upper portion 22. The use of the hardboard top 20 provides with the upper portion 22 a laminated structure which has increased strength in bending thereby providing for greater resistance to deformation such as buckling and eventual concave setting. The laminated structure also provides vibration dampening.

An advantage of the use of a hardboard material for the top 20 is that it can provide for a smooth work surface and also a surface upon which information can be printed. Thus in FIGS. 1 and 2 it can be seen that the top 20 is shown with dimension marks 36 and 38 on opposite sides. In addition tool information as shown by the bracketed material 40 can be provided. A central opening 43 through the laminated structure defined by the top 20 and upper portion 22 is provided for the blade of the sabre saw 12.

A pair of guide channels 42 and 44 are located on opposite sides 24 of the support plate 14 and are secured thereto by the fasteners 28 used to secure the leg portion 26b to the support member 14. The guide channels 42 and 44 can be used for various purposes and as shown in FIG. 1 are used to guide and locate an angle cut assembly 46. The assembly 46 can be selectively set along channels 42 or 44 via a wing bolt 48 and a nut 50 (see FIG. 4) which nut 50 is trapped between a cavity 52 in support arm 54 and an elongated guide rod 56. The guide rod 56 is secured to the arm 54 and is adapted to be slidably received within the guides 42 and 44. The angle cut assembly includes a guide block 58 rotatably secured to the support arm 54 via a protractor like structure 60 which can be clamped into the desired angulated position via a toggle like clamp structure 62.

The structure as thus far defined is compact and lightweight and hence is readily portable.

Figure 2:
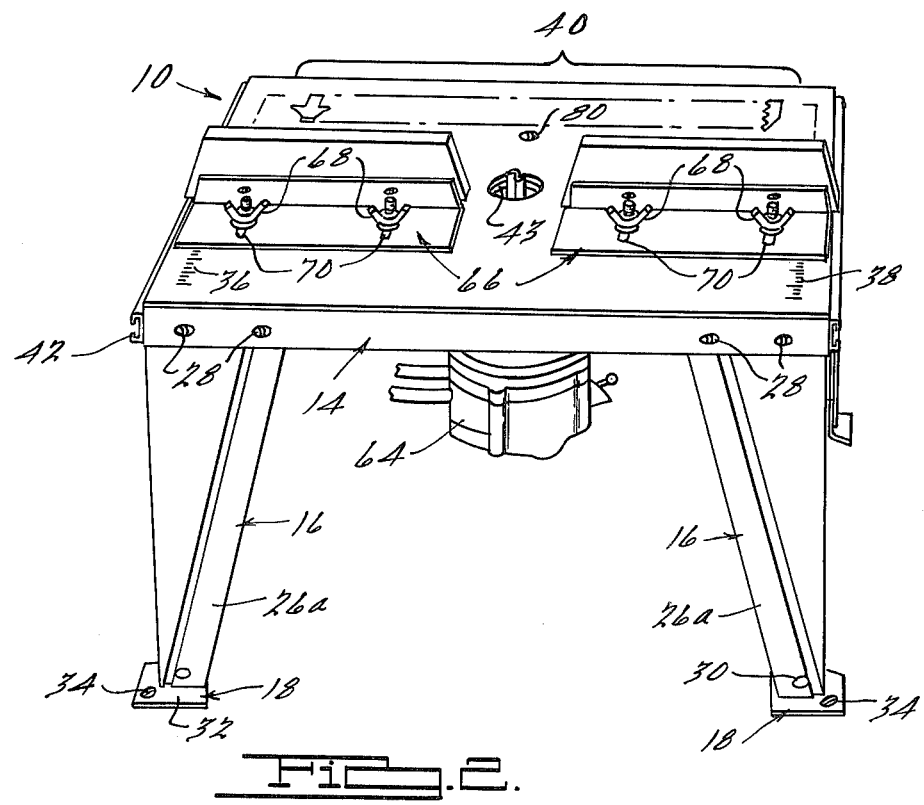
FIG. 2 is a pictorial view of the tool table of FIG. 1 shown adapted for use with a router.

FIG. 2 shows the table 10 as used with a router 64 which has its cutting tool extending through opening 43. In this case a pair of similar, adjustable guides 66 are selectively movably secured to the table 10 via pairs of wing nut fastener assemblies 68. The fastener assemblies cooperate with slots 70 in guides 66 whereby the guides can be selectively moved towards and away from the router cutting tool whereby the depth of cut can be adjusted. The wing nut assemblies 68 can be located in a first plurality of punched openings 73 (see FIG. 1) or a second similar plurality of punched openings 75 (while only two can be seen in FIG. 1, a similar pair are provided to the left of opening 43 as viewed in FIG. 1).

As can be seen from the prior discussion either a sabre saw 12 or a router 64 can be used with the table 10. The use of either of these tools with the table 10 is greatly facilitated by means of a mounting plate 72 (FIGS. 5 and 6).

The mounting plate 72 is of a circular shape and is provided with an inwardly dished portion 74 (FIGS. 3, 5 and 6) and an outer peripheral flange 76. The flange 76 is provided with a plurality of equally spaced notches 78 adapted to receive wing nut fastener assemblies 80 (FIGS. 1, 2 and 3) which cooperate with through openings in top 20 and upper portion 22 of table 10 whereby the plate 72 can be tightly clamped to the underside of the table 10, i.e. against the bottom surface of the upper portion 22. Support in stiffness is provided by a center flange 84 which surrounds a central opening 82 which is adapted to be located coaxially with table opening 43. Thus the support plate 72 can be assembled to the underside of table 10 simply by the manipulation of the three wing nut assemblies 80.

The support plate 72 is provided with a first pair of diametrically opposite radially extending slots 86a and 86b. A second pair of diametrically opposite radially extending slots 88a and 88b are located in quadrature with slots 86a and 86b and are more elongated than the latter. The slots 86a, 86b, 88a and 88b are adapted to receive machine screws for securing routers having a four point mounting system. The slots are sufficiently long to accommodate a variety of spacings in such four point mounting. Another pair of radially extending slots 90a and 90b are spaced equally from each other and from slot 86a, i.e. 120° apart. The slots 86a, 90a and 90b are adapted to receive machine screws for securing routers having a three point mounting system. Again the slots are sufficiently long to accommodate a variety of spacings in such three point mounting. Another pair of slots 92a and 92b are approximately 90° apart and are associated with slots 88a and 88b with slot 92a being approximately 45° from slot 88a and slot 92b being approximately 45° from slot 88b. Slots 92a and 92b are circumferentially elongated and cooperate with slots 88a and 88b for securing a sabre saw to the plate 72. This can be done with a plurality of fastener assemblies 94.

Each fastener assembly 94 comprises a bolt 96, a wing nut 98 and a clamping bracket 100. The clamping brackets 100 are generally U shaped and include legs 102 and 104. The bracket 100 is adapted to overengage the side ribs 106 and 108 of the base 110 of sabre saw 12. Thus the legs 104 are shorter than legs 102 since these legs will be extended over the ribs 106 and 108 and will be resting on the base 110. Thus by simply tightening the wing nuts 98, the sabre saw 12 can be clamped to the mounting plate 72. The slots 88a, 88b, 92a and 92b are elongated to accommodate sabre saws having bases of different widths.

Note that some of the slots described serve more than one function and hence are operative for more than one type of tool or tool mounting. Thus the mounting plate 72 is of a simplified construction and can accommodate a variety of different tools and tools of different sizes. It should be noted that the tool mounting slots are located in the dished portion of the plate 72. This provides clearance with the bottom surface of upper portion 22 for the heads of bolts used on the various assemblies.

The table 10 is of a lightweight construction with the support or base member 14 and legs 16 made of steel being approximately 0.020" thick. The feet 18 and mounting plate 72 are made of heavier gauge material and hence are approximately 0.035" thick. The top 20 is of a tempered hardboard construction having a thickness of approximately 0.250". With the use of a heavy gauge top 20 and somewhat heavier gauge feet 18 the remainder of the table 10 (excluding the support plate 72) can be made of a light gauge material, i.e. approximately 1.10th the thickness of top 20. The composite thickness of the top 20 and the upper portion 22 of support member 14 provide substantial stiffness to inward buckling or bending from the weight of the attached tool and mounting plate 72.

The outer edges of leg portions 26a and 26b are hemmed, i.e. provided with a double thickness by material folded over on itself as at 112a and 112b. At the same time the lowermost edges of the sides 24 of support plate 14 are similarly hemmed with folded over materials as at 114. The hemming serves two purposes; first it increases the total material thickness thereby increasing the strength and rigidity of the part and secondly it provides smooth, rounded, unbroken edges. These smooth edges eliminate the possibility of the operator cutting himself on burrs or sharp surfaces while manipulating the mounting plate 72 to mount, remove, or adjust an associated tool.

It should also be noted that the work surface on top 20 is smooth and ungrooved, i.e. no sub-surface slots. This provides for a simpler construction and also permits the use of a variety of attachments.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A tool table for a plurality of different tool assemblies each having a different type cutting tool, said table comprising a top structure, a plurality of legs secured to said top structure for supporting said top structure, said top structure being a laminated structure comprising a sheet metal base and a hardboard top adhesively secured thereto, said hardboard top having an upper surface defining a working surface for supporting the material to be worked on by the cutting tool, a generally centrally located opening in said top structure, and mounting means for mounting the plurality of different tools to said top structure with the cutting tool being extendable through the opening, said mounting means adapted to be secured to saber saws and routers, said mounting means comprising a generally annular member having an inwardly dished portion with a generally central tool aperture and an outer peripheral flange having a plurality of radially outwardly extending notches therein, first fastening means extending through said notches for removably securing said annular member to the underside of said top structure and below said upper surface with said tool aperture in line with said opening whereby said upper surface alone defines the working surface immediately surrounding the cutting tool of the saber saws and routers, said inwardly dished portion of said annular member having a first plurality of circumferentially distributed slots adapted to receive mounting means for attaching a router to said annular member and a second plurality of circumferentially distributed slots adapted to receive mounting means for attaching a saber saw to said annular member.

2. The tool table of claim 1 with the ratio of thickness of the hardboard top to that of the sheet metal base being approximately around 10:1 and with said upper surface of the hardboard top being printable and having printed thereon information useful for use of the tool assemblies.

3. The tool table of claim 2 with said hardboard top providing a smooth ungrooved surface and including a plurality of first aligned holes in said top structure, first workpiece guide means having a plurality of first slots located in alignment with said first aligned holes and movably secured to said hardboard top via fasteners extending through said first aligned holes and said first slots, a plurality of second aligned holes in said top structure with said first and second aligned holes being located on opposite sides of said opening, and second workpiece guide means having a plurality of second slots located in alignment with said second aligned holes and movably secured to said hardbaord top via fasteners extending through said second aligned holes and said second slots.

4. The tool table of claim 3 with said first workpiece guide means and said second workpiece guide means including first and second elongated guide blocks, said guide blocks being located on opposite sides of said opening and facing the same direction.

5. The tool table of claim 1 wherein said first plurality of slots on said inwardly dished portion of said annular member comprises a first set of four slots equally angularly circumferentially disposed whereby a router having a four point mounting can be assembled thereto and a second set of three slots equally angularly circumferentially disposed whereby a router having a three point mounting can be assembled thereto, and said second plurality of slots on said annular member being a third set of circumferentially disposed slots whereby a saber saw can be assembled to said inwardly dished portion of said annular member.

6. The tool table of claim 5 with at least one slot being common between at least two of the first, second and third set of slots.

7. The tool table of claim 5 with at least one slot being common between said first and second sets.

8. The tool table of claim 5 with at least one slot being common between said first and third sets.

9. The tool table of claim 5 with said third set of slots comprising two diametrically opposed slots and two other slots located less than 180° apart symmetrically spaced relative to said opposed slots.

10. The tool table of claim 9 with one slot being common between said first and second sets and with two slots being common between said first set and said third set, said two slots being diametrically opposed slots.

11. The tool table of claim 10 with all of said slots of said first, second and third sets being slotted radially except said two other slots which are slotted circumferentially.

12. The tool table of claim 5 with said mounting means comprising second fastening means for removably securing a sabre saw to said annular member at each said second plurality of slots, said fastening means including a U shaped channel member for straddling a portion of the sabre saw and having one leg longer than the other.

13. A tool table for a plurality of different tool assemblies each having a different type cutting tool, said table comprising a top structure, a plurality of legs secured to said top structure for supporting said top structure, said top structure being a laminated structure comprising a sheet metal base and a hardboard top adhesively secured thereto, said hardboard top having an upper surface defining a working surface for supporting the material to be worked on by the cutting tool, a generally centrally located opening in said top structure, and mounting means for mounting the plurality of different tools to said top structure with the cutting tool being extendable through the opening, said mounting means adapted to be secured to saber saws and routers, said mounting means comprising a generally annular member having an inwardly dished portion with a generally central tool aperture and an outer peripheral flange having a plurality of radially outwardly extending notches therein, and first fastening means extending through said notches for removably securing said annular member to the underside of said top structure and below said upper surface with said tool aperture in line with said opening whereby said upper surface alone defines the working surface immediately surrounding the cutting tool of the saber saws and routers, said annular member having a first plurality of circumferentially distributed slots whereby a router can be assembled to said annular member and a second plurality of circumferentially distributed slots whereby a saber saw can be assembled to said annular member, said sheet metal base having integral downwardly depending sides, said legs including elongated leg portions being of a sheet metal construction and secured at their upper ends to adjoining ones of said sides and terminating in heavy gauged feet secured to the opposite ends of said leg portions, said leg portions and said sides having their exposed edges folded upon themselves whereby sharp edges are obviated.

14. The tool table of claim 13 with the ratio of the thickness of the hardboard top to that of the sheet metal base being approximately around 10:1.

15. The tool table of claim 14 with said feet extending outwardly from the associated ones of said leg portions, and having mounting holes therein located outwardly from the associated ones of said leg portions, said feet being of a thickness approximately double that of said sheet metal base and said leg portions.

16. The tool table of claim 13 with said hardboard top being approximately 0.250" thick, said sheet metal base and said leg portions being approximately 0.020" thick and said feet being approximately 0.035" thick.

17. The tool table of claim 13 with said mounting means adapted to be secured to sabre saws and routers, said mounting means comprising a generally annular member having a general central tool aperture and first fastening means for removably securing said annular members to the underside of said top structure with said tool aperture in line with said opening, said annular member having a first plurality of circumferentially distributed slots whereby a router can be assembled to said annular member and a second plurality of circumferentially distributed slots whereby a sabre saw can be assembled to said annular member.

18. The tool table of claim 17 with said hardboard top providing a smooth ungrooved surface and including a plurality of first aligned holes in said top structure, and first workpiece guide means having a plurality of first slots located in alignment with said first aligned holes and movably secured to said hardboard top via fasteners extending through said first aligned holes and said first slots.

19. The tool table of claim 18 including a plurality of second aligned holes in said top structure with said first and second aligned holes being located on opposite sides of said opening, and second workpiece guide means having a plurality of second slots located in alignment with said second aligned holes and movably secured to said hardboard top via fasteners extending through said second aligned holes and said second slots.

20. The tool table of claim 19 with said second workpiece guide means and said third workpiece guide means including first and second elongated guide blocks, said guide blocks being located on opposite sides of said opening and facing the same direction.

* * * * *

UNITED STATES PATENT AND TRADEMARK OFFICE
CERTIFICATE OF CORRECTION

PATENT NO. : 4,186,784

DATED : February 5, 1980

INVENTOR(S) : John T. Stone

It is certified that error appears in the above-identified patent and that said Letters Patent are hereby corrected as shown below:

After "References Cited U.S. PATENT DOCUMENTS" include

```
--  323,229     7/1885     Strobridge et al
  1,253,473     1/1918     Davis
  1,273,207     7/1918     Wege
  1,379,623     5/1921     Hallowell
  1,828,248    10/1931     Hallowell et al
  2,599,096     6/1952     Dirksen
  2,822,836     2/1958     Horstmann et al
  3,060,979    10/1962     Hanvin
  3,285,303    11/1966     Kwiatkowski
  3,734,151     5/1973     Skripsky
  3,905,263     9/1975     Smith
  3,955,457     5/1976     Mendelson--
```

Column 4, line 1, "1.10th" should be --1/10th--.

Signed and Sealed this

Twenty-fourth Day of February 1981

[SEAL]

Attest:

RENE D. TEGTMEYER

Attesting Officer

Acting Commissioner of Patents and Trademarks